United States Patent
Oh et al.

(10) Patent No.: US 7,490,804 B2
(45) Date of Patent: Feb. 17, 2009

(54) MOUNT SYSTEM FOR A MONITOR HAVING A MOTORIZED TILT

(75) Inventors: Sung I. Oh, West Covina, CA (US); Gyu Chang Kim, Suwon Si (KR)

(73) Assignee: CLO Systems, LLC, West Covina, CA (US)

( * ) Notice: Subject to any disclaimer, the term of this patent is extended or adjusted under 35 U.S.C. 154(b) by 0 days.

(21) Appl. No.: 11/900,858

(22) Filed: Sep. 13, 2007

(65) Prior Publication Data

US 2008/0149795 A1 Jun. 26, 2008

Related U.S. Application Data

(60) Provisional application No. 60/844,437, filed on Sep. 13, 2006.

(51) Int. Cl.
*E04G 3/00* (2006.01)

(52) U.S. Cl. .................... 248/278.1; 248/919

(58) Field of Classification Search ............ 248/278.1, 248/279.2, 284.1, 286.1, 479, 292.12, 919, 248/921, 922, 923; 361/682; 74/421 A
See application file for complete search history.

(56) References Cited

U.S. PATENT DOCUMENTS

| 4,577,827 | A | * | 3/1986 | Eliscu .................. 248/656 |
|---|---|---|---|---|
| 4,720,805 | A | | 1/1988 | Vye |
| 5,124,805 | A | | 6/1992 | Chung et al. |
| 6,095,476 | A | | 8/2000 | Mathis |
| 6,357,768 | B1 | | 3/2002 | Chan et al. |
| 6,402,109 | B1 | | 6/2002 | Dittmer |
| 6,615,551 | B2 | | 9/2003 | Chesser et al. |
| 6,633,276 | B1 | | 10/2003 | Jaynes |
| 6,655,645 | B1 | | 12/2003 | Lu et al. |
| 7,048,242 | B2 | * | 5/2006 | Oddsen, Jr. ............. 248/280.11 |
| 2004/0211870 | A1 | | 10/2004 | Bremmon et al. |
| 2004/0245420 | A1 | | 12/2004 | Pfister et al. |
| 2006/0171105 | A1 | * | 8/2006 | Hsiao .................... 361/681 |
| 2008/0029661 | A1 | * | 2/2008 | Chen .................... 248/176.1 |

FOREIGN PATENT DOCUMENTS

| CH | 653464 A5 | 12/1985 |
|---|---|---|
| KR | 10-2005-0080139 A | 8/2005 |
| WO | WO2004051991 A | 6/2004 |

* cited by examiner

*Primary Examiner*—Ramon O Ramirez

(57) ABSTRACT

A mount system attaches a monitor to a support base such as a table or wall and is able to reposition the monitor through one or more motorized action. In particular, the mount system includes a motor to tilt the monitor. The mount system includes a mount plate that is adapted to attach to the back side of the monitor. The mount plate may be pivotably coupled to a housing at a first pivot point or axis so that the mount plate may pivot along the first pivot point relative to the housing. A shaft is provided between the mount plate and the housing. The shaft has a proximal end and a distal end. The distal end is pivotably coupled to the mount plate and the proximal end is coupled to a motor, and as the motor is activated, the distal end extends or retracts relative to the housing such that the mount plate extends or retracts relative to the housing.

6 Claims, 5 Drawing Sheets

MOUNT SYSTEM FOR A MONITOR HAVING A MOTORIZED TILT

RELATED APPLICATION

This application claims priority to a provisional application Ser. No. 60/844,437 filed Sep. 13, 2006, entitled "Motorized Mounting System Capable of Repositioning a Monitor," which is hereby incorporated by reference.

BACKGROUND OF THE INVENTION

1. Field of the Invention

This invention is directed to a mount system that is adapted to couple to a back side of a monitor and reposition the viewing angle of the monitor remotely, and in particular, tilt the monitor through a motorized action.

2. Background of the Invention

Flat panel monitors such as computer monitors, LCD, plasma, slim televisions, and the like (collectively referred to as "monitor(s)") are becoming popular because they can be mounted onto a wall to save floor space and for their aesthetically pleasing appearance. In many applications, the monitor is placed on a table, mounted to a wall, or even hanging from a ceiling. In these applications, however, in order to reposition the monitor, the viewer needs to walk over to the monitor and physically move the monitor to a new viewing angle. Repositioning a monitor, however, is not always feasible because of the weight of the monitor makes it difficult to move or the monitor may be located high above the floor so that the viewer may not be able to reach it without a ladder for example. Accordingly, there is a need to be able to reposition the monitor more easily.

SUMMARY OF THE INVENTION

This invention is directed to a mount system that attaches a monitor to a support base such as a table or wall and is able to reposition the monitor through one or more motorized action; and in particular, the mount system includes a motor to tilt the monitor. The mount system includes a mount plate that is adapted to attach to the back side of the monitor. The mount plate may be pivotably coupled to a housing at a first pivot point so that the mount plate may pivot along the first pivot point relative to the housing. The housing may have a first portion and a second portion. The first portion may be adapted to attach to a support base such as a stand, a ceiling post, or to a wall.

The second portion of the housing may have a shaft that extends and retract relative to the housing. The shaft may have a first end and a second end. The first end may be pivotably coupled to the mount plate at a second pivot point. The first point may be predetermined distance away from the second pivot point. The second end may be pivotably coupled to the housing and the second end may be mechanically coupled to a motor that extends and retracts the first end of shaft relative to the housing, which causes the mount plate to pivot relative to the housing. Depending on the orientation of the housing, the mount plate may tilt or swivel the monitor attached to the mount plate. Accordingly, the mount system may adjust the viewing angle of the monitor with a remote control.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
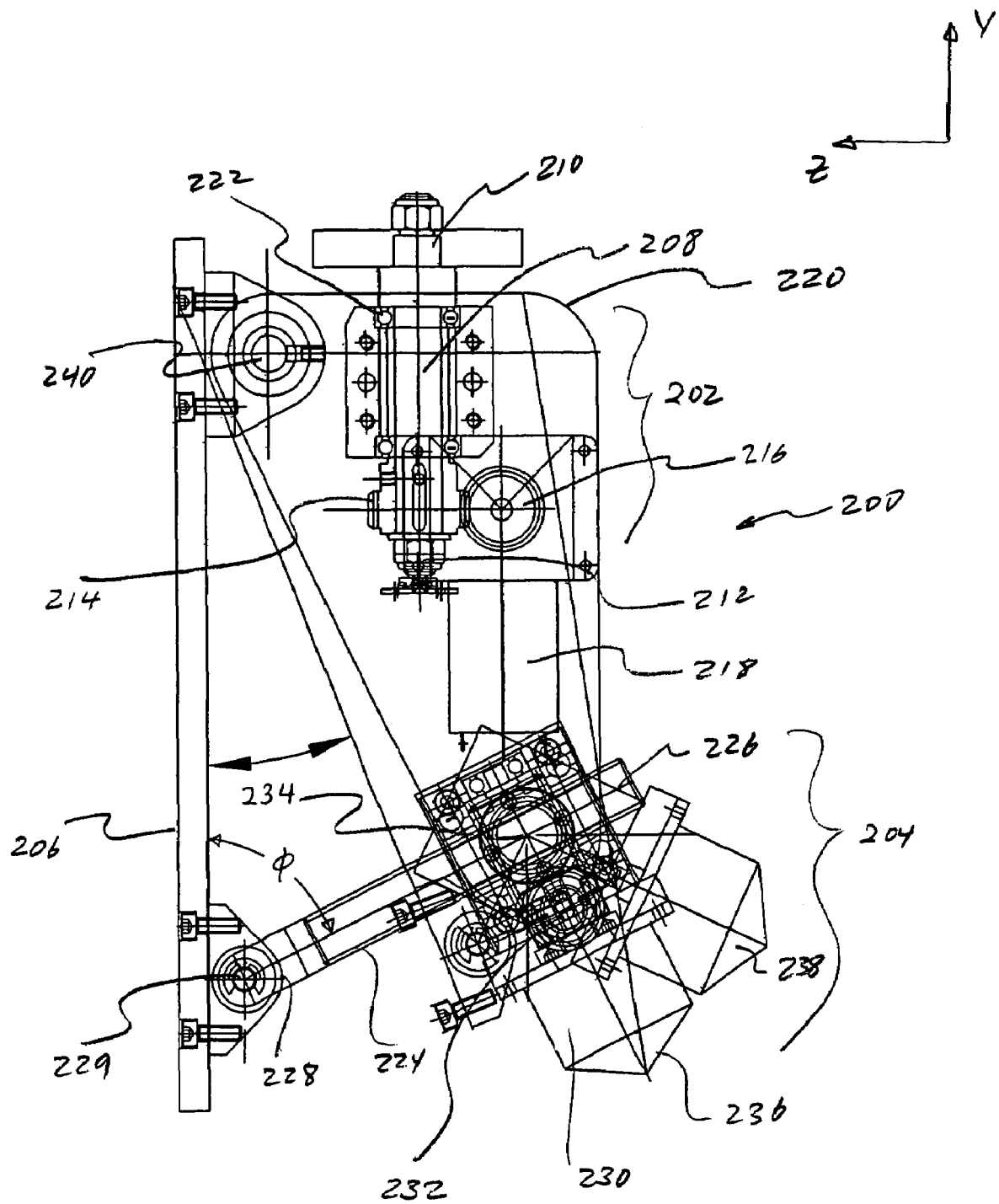
FIG. 1 shows a side view of a mount system that is able to swivel and/or tilt a monitor through one or more motors.

FIG. 1 shows a side view of a motorized mounting system 200 having a first portion 202 and a second portion 204 in reference to a YZ plane. The first portion 202 may be adapted to couple to a supporting structure such as a wall, ceiling, and stand, table, etc. The second portion 204 may be adapted to tilt or swivel relative to a mounting plate 206. The mounting plate 206 may be adapted to couple the back side of a flat screen monitor.

The first portion 202 includes a first shaft 208 having a proximal end 210 and a distal end 212. The proximal end 210 may be adapted to couple to a supporting structure such as a pole extending from a ceiling, stand, table, or wall. The distal end 212 may have a worm wheel 214 engaged with a worm gear 216 powered by a first motor 218. The first motor 218 and the worm gear 216 may be attached to a housing 220. The first portion 202 may includes bearings 222 between the housing 220 and the first shaft 208 such that the housing 220 may rotate around the first shaft 208. As such, as the first motor 218 rotates the worm gear 216, the worm gear may spin around the worm wheel 214, which in turn swivels the housing 220 around the first shaft 208 or around the Y-axis.

The second portion 204 includes a second shaft 224 having a proximal end 226 and a distal end 228. The proximal end 226 of the second shaft 224 may be adapted to engage with a second motor 230 to move the second shaft 224 substantially along its longitudinal axis. The distal end 228 of the second shaft 224 may be pivotably coupled to the mounting plate 206 about the pivot axis 229. The second shaft 224 may be a screw where the proximal end 226 of the screw engages with a gear mechanism 232 which is powered by the second motor 230. The second motor 230 and the gear mechanism 232 may pivot about a pivot axis 234 between a first position 236 and a second position 238. The pivot axis 234 may be between the proximal end 226 and the distal end 228. In particular, the pivot axis 234 may be adjacent to the proximal end 226. The second motor 230 may cause the second shaft 224 to extend or retract relative to the housing 220. If the second shaft 224 is substantially straight, the second shaft 224 may pivot about the pivot axis 234 as the distal end 228 extends and retracts relative to the housing 220 so that the mount plate 206 may pivot about a pivot axis 240. Alternatively, the second shaft 224 may be a piston type actuator that moves back and forth along its longitudinal axis. Note that a variety of mechanisms and methods known to one skilled in the art may be employed to move the shaft long its longitudinal axis.

The mounting plate 206 may be pivotably coupled to the housing 220 about the pivot axis 240. As the second motor 230 extends or retracts the second shaft 224 along its longitudinal axis relative to the housing 220, the mounting plate 206 may pivot or tilt about the pivot axis 240 in the clockwise and counter-clockwise directions along the YZ-plane. As the second motor 230 extends or retracts the second shaft 224, the angle ø between the mounting plate 206 and the second shaft 224 may decrease or increase, respectively, which in turn causes the second shaft 224 and second motor 230 to pivot about its pivot axis 234 between the first position 236 and the second position 238.

Alternatively, the distal end 228 of the second shaft 224 may slide along the Y axis adjacent to the mounting plate 206 as the second shaft 224 extends and retracts along its longitudinal axis while the second motor 230 is fixed in its position. Accordingly, the motorized mounting system 200 may swivel a flat screen monitor attached to the mounting plate 206 about the longitudinal axis of the first shaft 208, and tilt the monitor about the pivot axis 240.

Figure 2:
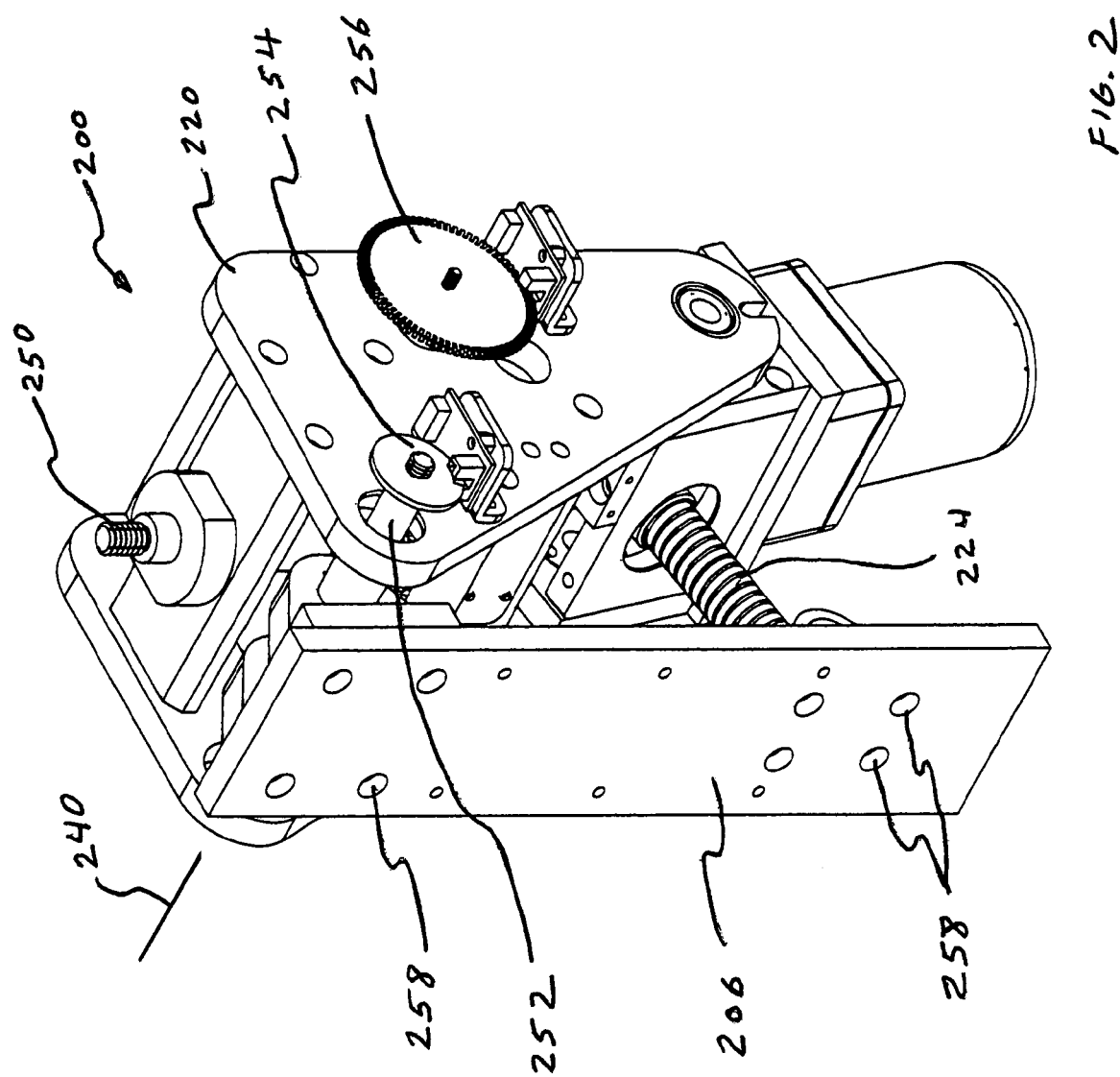
FIG. 2 shows a perspective view of the mounting system of FIG. 1.

FIG. 2 shows a perspective view of the motorized mounting system 200. The housing 220 may have an attachment element 250 to allow the mounting system 200 to couple to a supporting structure such as a ceiling post and a table stand. The attachment element 250 may be a screw for example. A shaft 252 may be provided between the mounting plate 206 and the housing 220 along the pivot axis 240. One end of the shaft 252 may be provided with a first encoder 254 to allow the control system (not shown) to monitor the position of the mounting plate 206 relative to the housing 220. In reference to FIG. 1, one end of the worm gear 216 may have a second encoder 256 to allow the control system to monitor the swivel angle of the housing 220 relative to a reference plane or axis. FIG. 2 also shows that the mounting plate 206 may have a number of openings 258 to allow one or more bolts to attach to the back side of the monitor.

Figure 3:
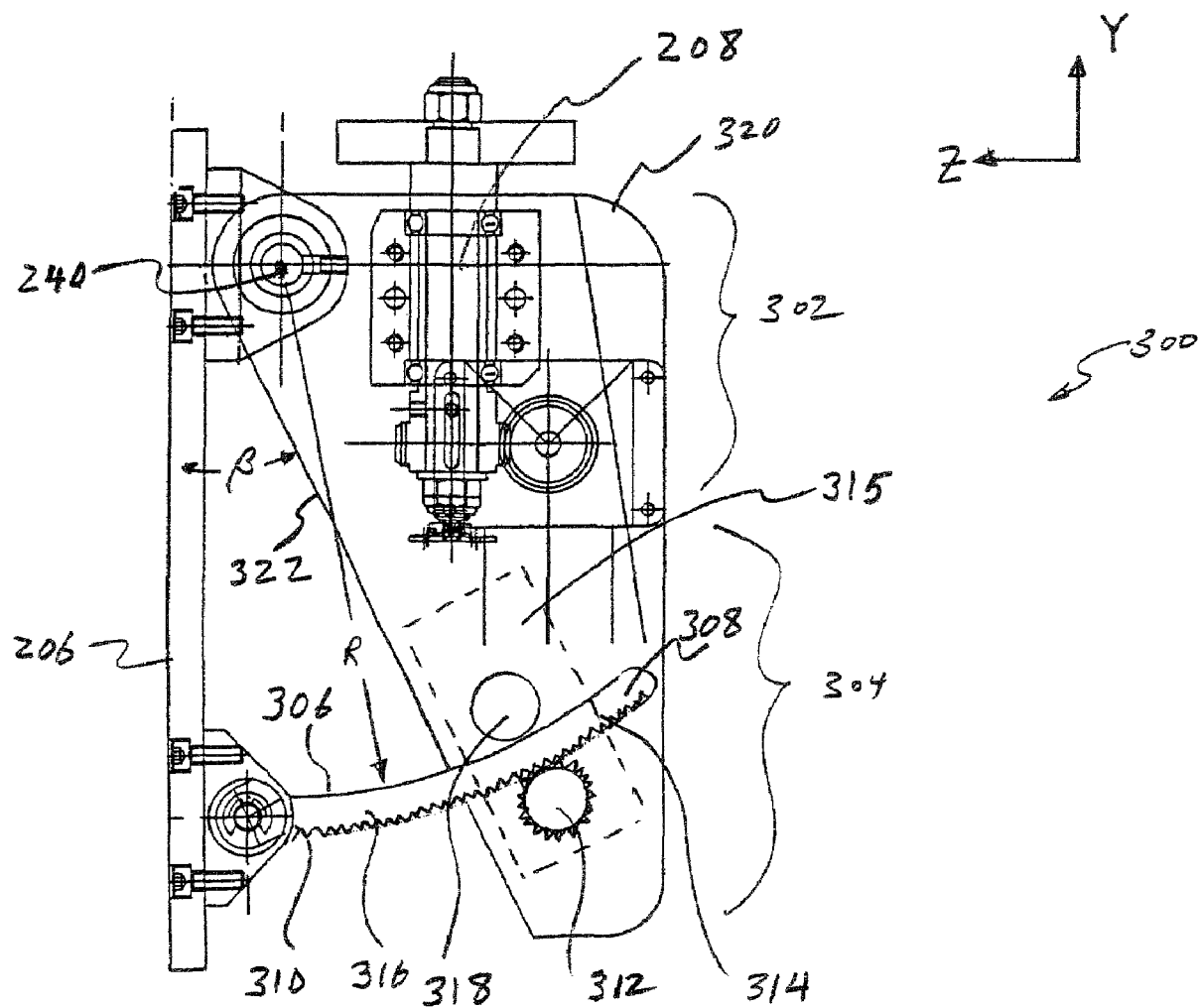
FIG. 3 shows a side view of an alternative mount system that is able to swivel and/or tilt a monitor through one or more motors.

FIG. 3 shows a motorized mounting system 300 adapted to swivel and tilt a flat screen monitor. The motorized mounting system 300 includes a first portion 302 and a second portion 304. The first portion 302 is substantially similar to the first portion 202 described above. The second portion 304 includes an arcing gear 306 having radius R about the pivot axis 240. The gear 306 may have an arc configuration with a proximal end 308 and a distal end 310. The gear 306 may be engaged with a first gear 312, which is coupled to a second motor 315. The gear 306 may have a first portion 314 between the proximal end 308 and the first gear 312 and a second portion 316 between the distal end 310 and the first gear 312. The first gear 312 may be paired with a second gear 318, which aligns the arcing gear 306 to pass between the first and second gears 312 and 318. The first and second gears 312 and 318 may be coupled to a housing 320. The housing 320 may have a front side that is tapered relative to the mounting plate 206 when it is in an upright position forming an angle β between the mounting plate 206 and the front side 322 of the housing 320. The space between the front side 322 and the mounting plate 206 allows the mounting plate 206 to pivot or tilt degrees.

The motorized mounting system 300 may tilt a monitor attached to the mounting plate 206 in a clockwise direction by rotating the first gear 312 in a counter-clockwise direction in reference to the YZ-plane so that the first portion 314 of the arcing gear 306 passes through the first gear 312. Conversely, the motorized mounting system 300 may tilt a monitor in a counter-clockwise direction by rotating the first gear 312 in a clockwise direction so that the second portion 316 of the arcing gear 306 passes through the first gear 312. Accordingly, the motorized mounting system 300 may swivel a flat screen monitor attached to the mounting plate 206 about the longitudinal axis of the first shaft 208, as discussed above, and tilt the monitor about the pivot axis 240.

Figure 4:
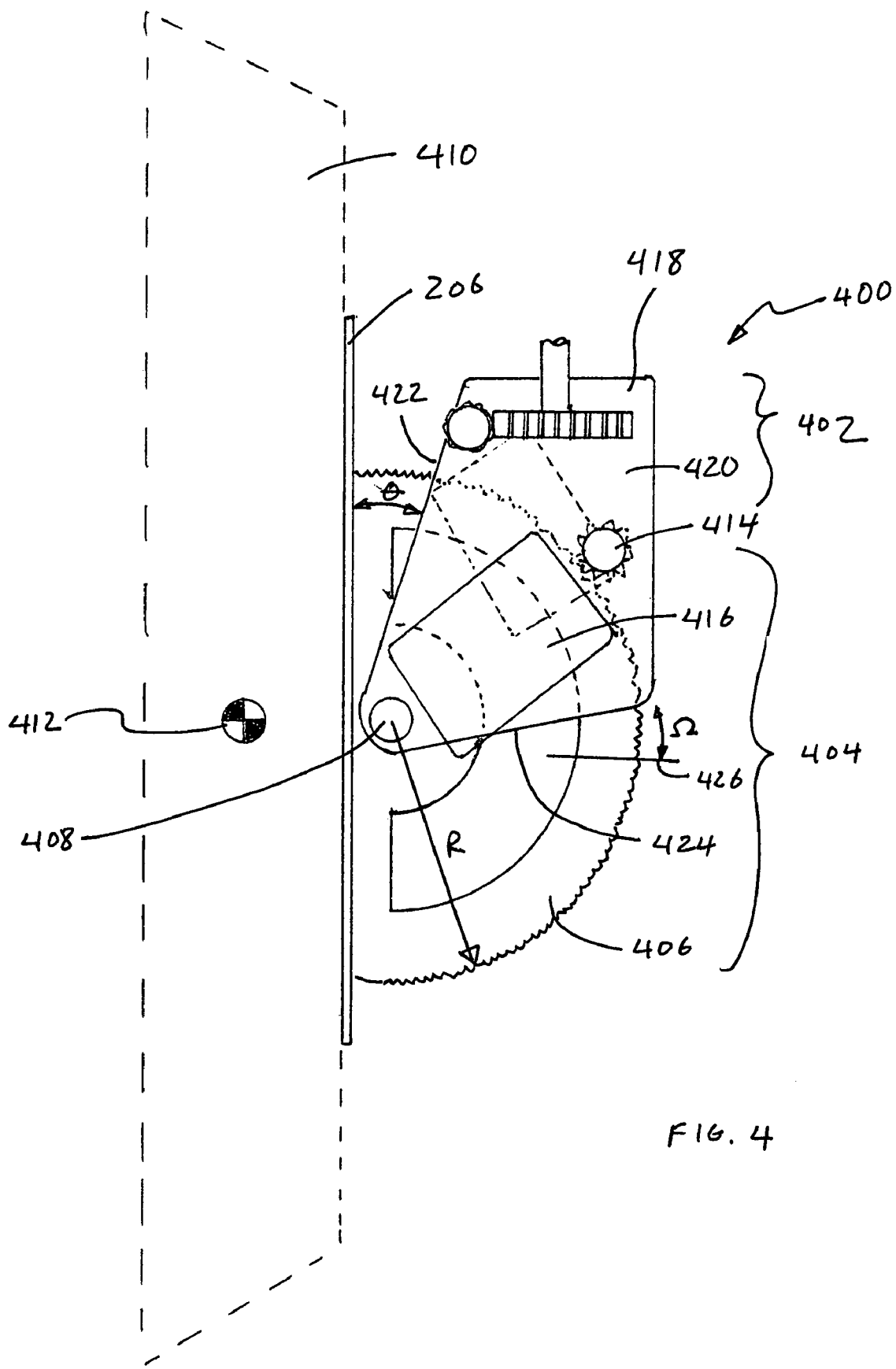
FIG. 4 shows a side view of another alternative mount system that is able to swivel and/or tilt a monitor through one or more motors.

FIG. 4 shows a motorized mounting system 400 adapted to swivel and tilt a flat screen monitor. The motorized mounting system 400 includes a first portion 402 and a second portion 404. The first portion 402 is substantially similar to the first portion 202 described above. The second portion 404 includes a semi circular tilt gear 406 having radius R about a tilt axis 408. The tilt gear 406 is attached to the mounting plate 206 which is adapted to couple to a flat screen monitor 410. The mounting plate 206 may attach to the back side of the monitor 410 such that the tilt axis 408 may be substantially adjacent to the center of gravity 412 of the monitor.

The second portion includes a gear 414 that is engaged with the tilt gear 406 to rotate the tilt gear 406 in the clockwise or counter-clockwise direction about the tilt axis 408. The gear 414 may be mechanically coupled to a tilt motor 416. The gear 414 and the tilt motor 416 may be attached to a housing 418 having side plates 420. The side plates 420 may have a front side 422 and a bottom side 424. The front side 422 faces the mounting plate 206 forming an angle 63 between the two sides. This allows the monitor 410 to tilt in the clockwise direction from the upright position by ϴ degrees. The bottom side 424 may be tapered in the upward direction forming an angle Ω relative to a horizontal line 426 to allow the monitor to tilt in the counter-clockwise direction by Ω above the horizontal line 426.

Figure 5:
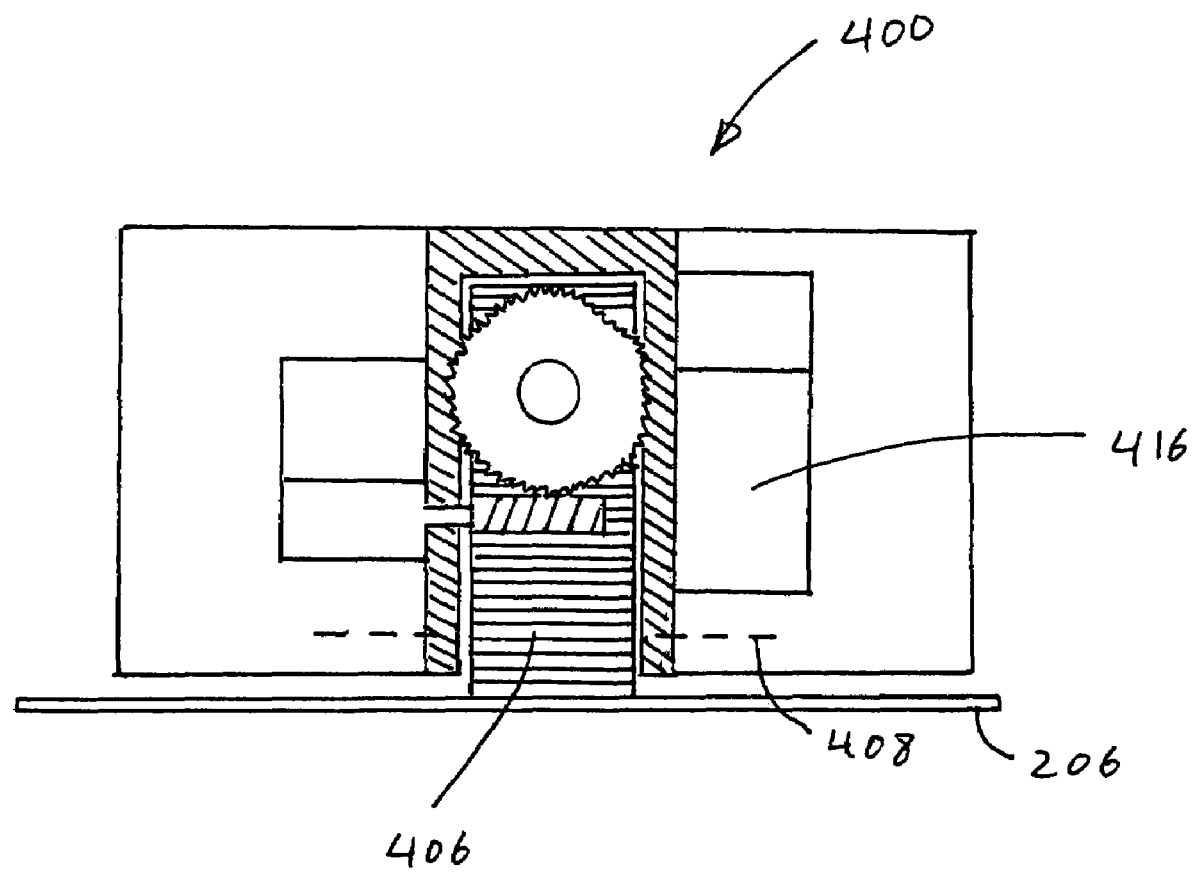
FIG. 5 shows a top view of the mount system of FIG. 4.

FIG. 5 shows the top view of the motorized mounting system 400. The housing 418 may enclose the circuit board to control the motors and the power supply to provide power to the motors.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A mount system adapted to couple a monitor to a support base and reposition the monitor having a back side, the mount system including:
    a housing adapted to couple to a support base;
    a mounting plate adapted to couple to the back side of the monitor, the mounting plate pivotably coupled to the housing along a first pivot axis;
    a motor coupled to the housing; and
    a shaft having a proximal end and a distal end, the proximal end adapted to mechanically engage with the motor, the distal end adapted to pivotably couple to the mounting plate along a second pivot axis such that activation of the motor causes the second pivot axis to extend or retract relative to the housing, and the shaft is pivotably coupled to the housing along a third pivot axis located between the proximal end and distal end of the shaft such that the shaft pivots about the third pivot axis as the distal end of the shaft extends or retracts.

2. The mount system according to claim 1, where the shaft is substantially straight.

3. A mount system adapted to couple a monitor to a support base and reposition the monitor having a back side, the mount system including:
    a housing adapted to couple to a support base;
    a mounting plate adapted to couple to the back side of the monitor, the mounting plate pivotably coupled to the housing along a first pivot axis;
    a motor coupled to the housing; and
    a shaft having an arc configuration and having a proximal end and a distal end, the distal end adapted to pivotably couple to the mounting plate along a second pivot axis, the shaft having a radius of curvature that is substantially similar to a distance between the and second pivot axes, and at least a portion of the shaft adapted to mechanically engage with the motor such that activation of the motor causes the second pivot axis to extend or retract relative to the housing.

4. The mount system according to claim 3, including a first gear and a second gear coupled to the housing, the motor mechanically engaged with at least one of the first and second gears, and the shaft is between the first and second gears.

5. A mount system adapted to pivot a monitor having a back side, the mount system including:
 a housing adapted to couple to a support base;
 a mounting plate having a plurality of openings adapted to receive at least one bolt to attach the mounting plate to the back side of the monitor, and the mounting plate adapted to pivotably coupled to the housing about a first axis;
 a motor coupled to the housing in a fixed position; and
 a shaft having a proximal end and a distal end, the proximal end adapted to mechanically engage with the motor such that activation of the motor causes the shaft to rotate the distal end adapted to slideably support to the mounting plate about a second axis such that activation of the motor causes the distal end to rotate, and the rotation of the distal end causes the second axis to extend or retract relative to the housing such that the mounting plate pivots about the first axis and the distal end to slide relative to the mounting bracket.

6. The mount system according to claim 5, when the mount system is in use and the motor is activated, the distal end slides vertically relative to the mounting plate.

* * * * *